Dec. 11, 1928.

G. L. HINMAN 1,694,743

STRAINER

Filed Oct. 17, 1927

Inventor:
George L. Hinman,
by Calvert Calvert
Att'ys.

Patented Dec. 11, 1928.

1,694,743

UNITED STATES PATENT OFFICE.

GEORGE L. HINMAN, OF NEW HAVEN, CONNECTICUT, ASSIGNOR TO THE GREIST MANUFACTURING COMPANY, A CORPORATION OF CONNECTICUT.

STRAINER.

Application filed October 17, 1927. Serial No. 226,627.

This invention relates to a strainer which is more particularly intended for use with a lubricating or oil pump but which may be used for other purposes; and the invention has for its object to produce a strainer which is of simple construction, so as to be manufactured at little cost, and which will be durable and efficient in operation.

To this end the strainer comprises a strainer head adapted to be mounted on a pump tube and consisting of a disk-like cap the periphery of which is of inverted U-form, and into which U-formed periphery the upper end of the circular strainer body is entered so as to be clamped therein or otherwise fixed thereto. The body of the strainer, which is preferably shaped much like an inverted thimble, has a rounded lower part. This strainer body is finely perforated or foraminous throughout, so as to permit the entry of oil or other fluid, while excluding solid particles. The strainer cap is preferably provided with a sleeve by which it is attached to the pump tube, and the said cap is also preferably perforated. The pump tube is suitably attached to a valve seat having a screw threaded portion by which it may be fixed to the pump.

Figure 1:
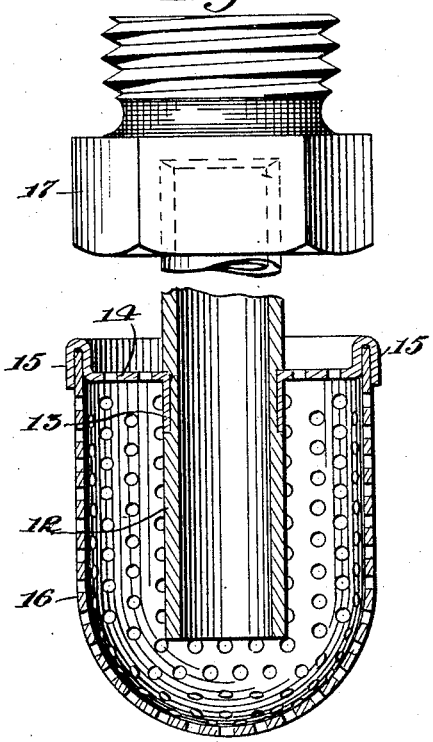
Figure 2:
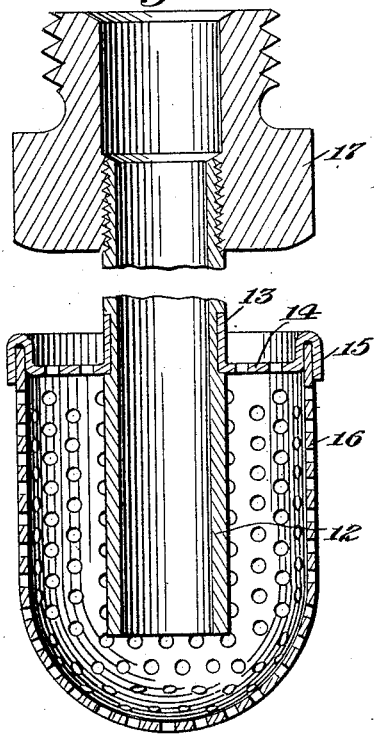
Figure 3:
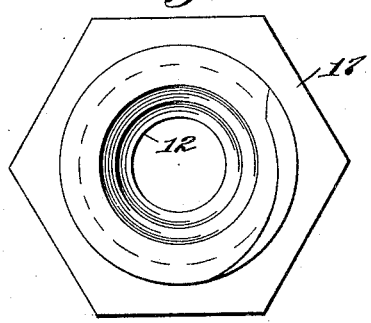
Figure 4:
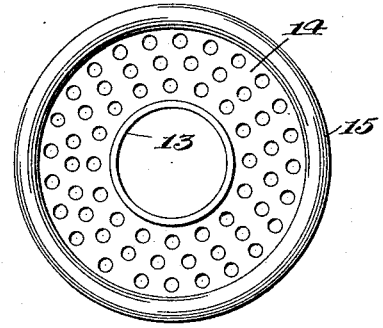

In the accompanying drawings Figs. 1 and 2 are sectional elevations illustrating two slightly different forms of the invention. Fig. 3 is a plan view of the valve seat and Fig. 4 a plan view of the strainer cap.

Referring to the drawing, 12 denotes a pump tube to which is attached, preferably by a sleeve 13, a strainer head or cap 14 having a periphery 15 of inverted U-shape into which is entered the upper end of a thimble-formed foraminous strainer 16 fixed in any suitable manner to the said U-shaped peripheral part of the strainer head or cap 14. At the upper end of the pump tube 12 is mounted a valve seat 17, the connection of said valve seat and tube being preferably a screw threaded one as shown in Fig. 2; although these parts may be connected or fixed together in any suitable manner. In the construction shown in Fig. 1 the sleeve 13 of the strainer head or cap 14 is shown as being turned down, so as to be concealed within the strainer body, while in the construction shown in Fig. 2 this sleeve is turned up. The sleeve 13 is preferably recessed into the tube 12, as shown, to secure these parts together.

From the foregoing it will be understood that the invention provides a strainer of simple construction which may be manufactured at little cost and which will be durable and efficient in operation.

Having thus described my invention I claim and desire to secure by Letters Patent:

1. The combination with a pump tube, of a strainer fixed thereto and consisting of a disk-like cap having an inverted U-shaped periphery, and an inverted foraminous thimble-like strainer body the upper end of which is entered into and suitably attached to said U-shaped periphery of said cap.

2. The combination with a pump tube, of a strainer fixed thereto and consisting of a perforated disk-like cap having an inverted U-shaped periphery, and an inverted foraminous thimble-like strainer body the upper end of which is entered into and suitably attached to said U-shaped periphery of said cap.

3. The combination with a pump tube and a valve seat to which said tube is attached, of a strainer fixed thereto and consisting of a disk-like cap having an inverted U-shaped periphery, and an inverted foraminous thimble-like strainer body the upper end of which is entered into and suitably attached to said U-shaped periphery of said cap.

4. The combination with a pump tube, of a strainer fixed thereto and consisting of a disk-like cap having an inverted U-shaped periphery, and an inverted foraminous thimble-like strainer body the upper end of which is entered into and suitably attached to said U-shaped periphery of said cap, said cap having a sleeve by which it is attached to said tube.

5. The combination with a pump tube, of a strainer fixed thereto and consisting of a disk-like cap having an inverted U-shaped periphery, and an inverted foraminous thimble-like strainer body the upper end of which is entered into and suitably attached to said U-shaped periphery of said cap, said cap having a sleeve by which it is attached to said tube which is recessed for the reception of said sleeve.

In testimony whereof I affix my signature.

GEORGE L. HINMAN.